United States Patent [19]

Kadota

[11] 4,452,494
[45] Jun. 5, 1984

[54] HYDRAULIC PRESSURE CONTROL VALVE FOR A DUAL-CIRCUIT HYDRAULIC BRAKING SYSTEM

[75] Inventor: Shinkichi Kadota, Hamamatsu, Japan

[73] Assignees: Nissan Motor Company, Ltd., Yokohama; Rhythm Motor Parts Mfg. Co., Ltd., Hamamatsu, both of Japan

[21] Appl. No.: 297,021

[22] Filed: Aug. 27, 1981

[30] Foreign Application Priority Data

Aug. 30, 1980 [JP] Japan .............................. 55-120186

[51] Int. Cl.³ .................................................. B60T 8/26
[52] U.S. Cl. ..................................... 303/6 C; 188/349; 303/24 A; 303/24 F
[58] Field of Search .................. 303/6 C, 24 R, 24 A, 303/24 F, 24 C, 22 R, 22 A, 84 A, 84 R, 52, 6 R; 188/349, 195, 345, 151 A

[56] References Cited

U.S. PATENT DOCUMENTS

| | | | |
|---|---|---|---|
| 4,053,186 | 10/1977 | Jakobi | 303/22 R |
| 4,220,375 | 9/1980 | Burgdorf et al. | 303/6 C |
| 4,281,880 | 8/1981 | Gaiser et al. | 188/349 X |
| 4,284,307 | 8/1981 | Kubota et al. | 303/24 C X |
| 4,284,308 | 8/1981 | Hayashida | 303/6 C |

FOREIGN PATENT DOCUMENTS

| | | |
|---|---|---|
| 2402291 | 7/1975 | Fed. Rep. of Germany ...... 303/6 C |
| 2819439 | 12/1978 | Fed. Rep. of Germany . |
| 2820768 | 11/1979 | Fed. Rep. of Germany . |
| 1478136 | 6/1977 | United Kingdom . |
| 2082706 | 3/1982 | United Kingdom ............ 303/24 A |

*Primary Examiner*—Douglas C. Butler
*Attorney, Agent, or Firm*—Schwartz, Jeffery, Schwaab, Mack, Blumenthal & Koch

[57] ABSTRACT

A free piston is reciprocally disposed within a first plunger unit associated with one of two circuits which plunger also houses a poppet valve actuatable by the free piston. A second plunger is reciprocally received in one end of the first plunger unit and also has a poppet valve actuatable by the free piston. The second plunger is biased toward the first by an actuator piston/spring arrangement subject to control by a valve responsive to vehicular deceleration. During pressure modulation the free piston reciprocates back and forth rapidly, opening and closing each of the poppet valves. Upon failure of one of the dual circuits both of the plungers shift in the same direction causing one poppet valve to remain open and prevent pressure modulation. Upon failure of the other circuit, the pressure transmitted by the arrangement markedly increases to produce the necessary deceleration to close a deceleration sensitive valve and induce modulation. Further, the lack of bias on one end of the free piston elevates the modulation point at which the other poppet valve begins modulation whereby an adequately high pressure is discharged.

14 Claims, 3 Drawing Figures

HYDRAULIC PRESSURE CONTROL VALVE FOR A DUAL-CIRCUIT HYDRAULIC BRAKING SYSTEM

BACKGROUND OF THE INVENTION

1. Field of the Invention

The present invention relates generally to a hydraulic pressure control valve and more specifically to a pressure control valve for an "X" type dual circuit hydraulic braking system which valve includes a fail-safe feature in the event of a failure in one circuit.

2. Description of the Prior Art

In a previously proposed arrangement each circuit of an "X" type dual circuit arrangement has been provided with a valve unit of the type shown in FIG. 1 of the drawings. Each of these valve units includes a proportioning valve which modulates the pressure transmitted therethrough subsequent to a modulation point being reached, and a so called "G" valve which functions to sense the degree of deceleration of the vehicle and, upon a given deceleration of the vehicle being sensed, induces the proportioning valve to commence modulating the pressure transmitted therethrough. Viz., upon applying the brakes of a vehicle sufficiently to induce the aforementioned given degree of deceleration, a "G"-ball 1 rolls up a predetermined inclination to contact and close a valve seat 2 thus isolating an actuator piston 3 from a source of pressure P1 (from a tandem master cylinder). This traps a predetermined hydraulic pressure PG in the chamber to which the actuator piston 3 is exposed. Upon this trapping, the actuator piston ceases to stroke against the bias of springs 4 and 5 whereby a constant load is applied to a plunger 6 of the proportioning valve through said springs and the split or modulation point of the proportioning valve is determined.

Under the above conditions as the hydraulic pressure P1 rises, the plunger 6 is moved leftwardly against the combined bias of the springs 4 and hydraulic pressure PG acting on the actuator piston 3 by the pressure in the chamber 7 on the right-hand side of the land 8 formed on the plunger 6. This moves the stem of a poppet valve 9 out of contact with the end plug 10 of the proportioning valve bore allowing the poppet valve 9 of close and temporarily inhibit the increase in the pressure P2.

Following the closure of the poppet valve the pressure P1 increases in the chamber 11 defined on the left-hand side of the land 8 which moves the plunger back against the pressure trapped in the chamber 7, thus bringing the poppet valve stem back into contact with the end plug 10 re-opening the poppet valve. The plunger 6 is thus reciprocated rapidly back and forth, repeatedly opening and closing of the poppet valve and accordingly modulating the pressure $P_2$ transmitted through the valve to a rear wheel brake cylinder in a desired skid preventing manner.

Now, while this arrangement has provided desirable braking characteristics under normal conditions, it has suffered from the drawbacks that two relatively expensive and heavy valves must be incorporated into the system and, more importantly, in the event of the failure of one of the two circuits, the valve disposed in the operative circuit still functions normally inducing a pressure reduction to the rear wheel brake cylinder with which it is associated. Accordingly, even when it is desired to apply the maximum braking pressure to the now single operative rear wheel brake cylinder, the modulation of the pressure to said cylinder still occurs reducing the braking capacity under such conditions.

SUMMARY OF THE INVENTION

The present invention features a single pressure control valve for an "X" type dual-circuit hydraulic braking system which functions to individually modulate the pressures fed to each of the rear wheels. The contact valve is not only simple and easy to assemble but includes a fail-safe feature in that (a) upon the failure of one of the two circuits, modulation of the pressure fed to the now single operative rear brake cylinder is prevented and (b) in the event the other circuit fails, before a deceleration sensitive valve can be induced to close and initiate pressure modulation, the pressure transmitted through the circuit is markedly elevated (e.g. approximately doubled) so as to induce the required vehicular deceleration. Subsequently, in this case due to the absence of the pressure in one circuit, the modulation point tends to be elevated. The limited braking capacity available under such conditions is accordingly maximized.

More specifically, the invention features a free piston which is reciprocally disposed within a first plunger unit associated with one of the two circuits, which plunger also houses a poppet valve actuatable by said free piston; and a second plunger which is reciprocally received in one end of the first plunger unit and which also has a poppet valve actuatable by said free piston. This second plunger is biased toward the first by an actuator piston/spring arrangement subject to control by a valve responsive to vehicular deceleration.

Under normal malfunction free operation, the free piston subsequent to the latter mentioned valve sensing a predetermined deceleration, reciprocates back and forth rapidly opening and closing each of the poppet valves in turn to induce pressure modulation. However, upon failure of one of the dual circuits, both of the plungers shift in the same direction. This shift causes one of the poppet valves to remain open and prevent pressure modulation thereby. Conversely, upon failure of the other circuit the pressure transmitted therethrough must approximately double before the partially operative braking system will produce a vehicular deceleration which will close a vehicular deceleration sensitive valve and induce pressure modulation. In addition to this, the resulting lack of bias on one end of the free piston induces a new equilibrium which causes the point at which the other poppet valve begins modulation operation to be elevated to the point where an adequately high pressure is fed to the rear brake associated therewith.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENT

Figure 1:
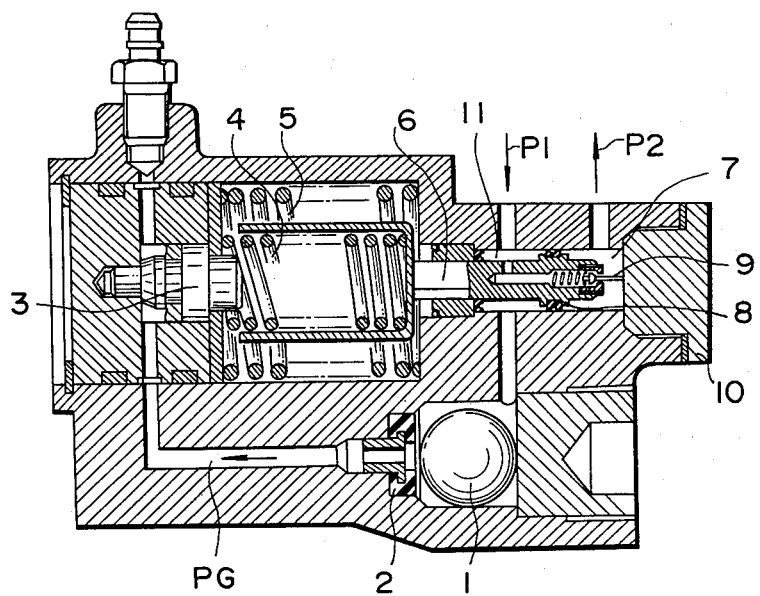
FIG. 1 is a sectional elevation of one of a pair of pressure control valves used in the prior art arrangement discussed under the heading of "Description of the Prior Art"
Figure 2:
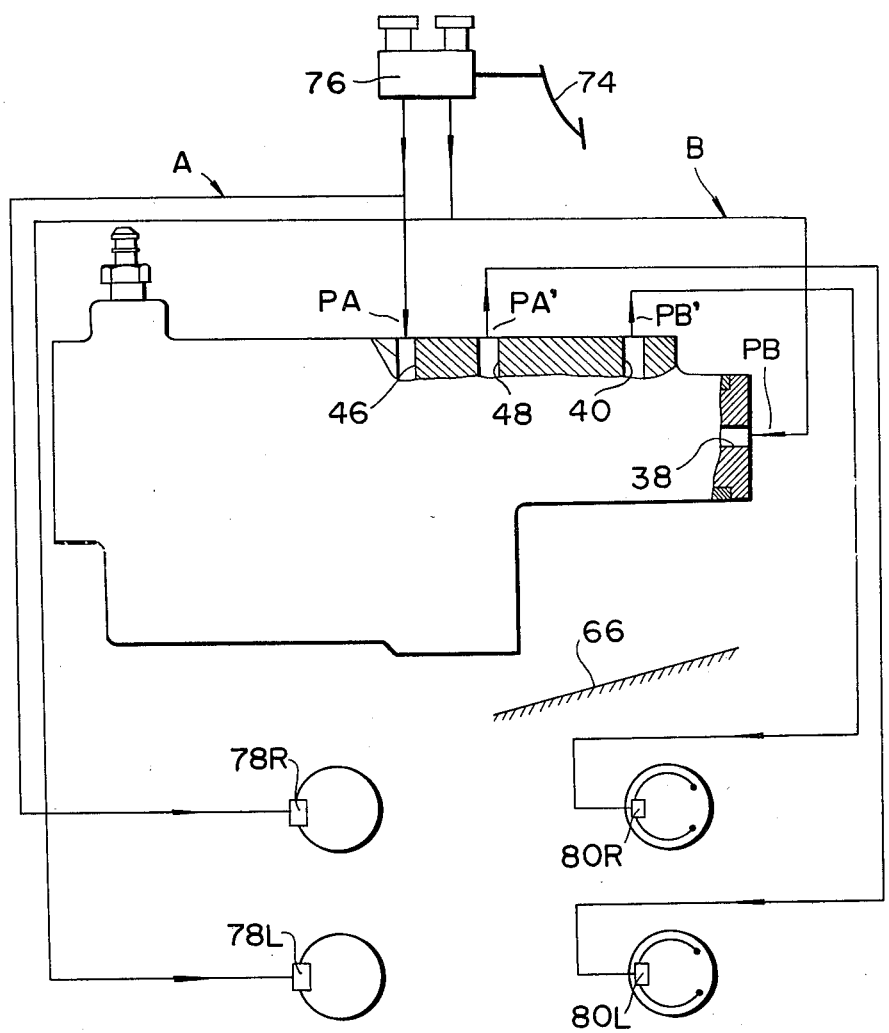
FIG. 2 is a schematic view showing a valve according to the present invention incorporated in an "X" type dual-circuit hydraulic braking system.
Figure 3:
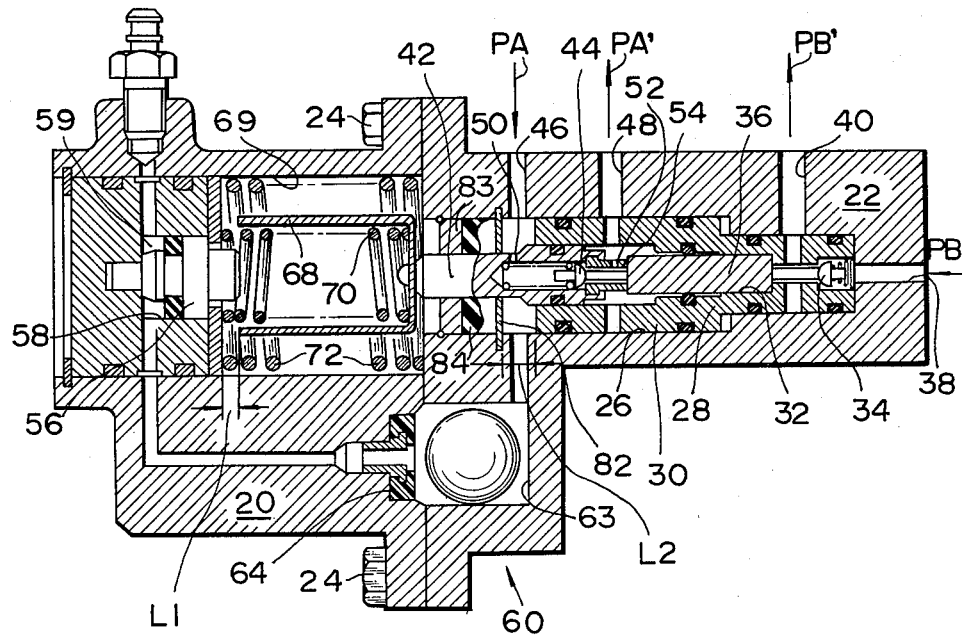
FIG. 3 is a sectional elevation of a pressure control valve according to the present invention.

Turning now to FIGS. 2 and 3 a preferred embodiment of the present invention is shown. As clearly shown in FIG. 3 the valve according to the present invention consists of first and second housings 20 and 22 which are secured together by bolts 24. The second housing 22 is formed with a stepped bore 26 in which a first plunger unit 28 is disposed. This plunger unit 28 includes a guide piston 30 formed integrally therewith. Formed within the plunger unit is a stepped bore 32 in which a poppet valve 34 and a free piston 36 are disposed. As shown, the poppet valve 34 has a stem abutable with an end of the free piston 36 and a spring which biases the poppet valve element toward a seated position wherein it blocks communication between a first inlet port 38 and a first outlet port 40 formed in the second housing. Slidably received in other end of the stepped bore 32 is a second plunger 42. This plunger 42, like the first, contains a poppet valve 44 for controlling fluid communication between a second inlet port 46 and a second outlet port 48. The poppet valve 44 also has a stem abutable with an end of the free piston 36 and is biased toward a closed position by a spring. In this arrangement radial bores or the like 50, 52 are formed in the plunger to allow communication between the ports when the poppet valve 44 is open. The sleeve member 54 extending from the inboard end of the second plunger and which surrounds the stem of the poppet valve, is adpated to be abutable with the left-hand end (as seen in the drawings) of the free piston.

An actuator piston 56 is reciprocally disposed in a bore 58 formed in the first housing 20. The variable volume chamber 59 defined in said bore by the actuating piston is fluidly communicated with the second inlet port 46 via a vehicle deceleration responsive valve generally denoted by the numeral 60. This valve, in the illustrated embodiment, takes the form of an inertia responsive member or "G" ball 62 disposed in a cavity 63 formed in the second housing. Ball 62 is adapted to roll upwardly along the lower wall of the cavity to seat on a valve seat 64 disposed in the first housing 20, upon being subject to a predetermined degree of deceleration. The point at which the ball 62 will move, of course, can be controlled by varying the mass of the ball and the degree of inclination of the lower wall with respect to the longitudinal axis 66 of the vehicle to which the valve is attached.

A cup-like cylindrical housing 68 is fixed to one end of the second plunger 42 and extends through a large diameter cavity 69 formed in the first housing 20. This member receives therein a spring 70 which biases the cup-like housing 68 and the actuator piston 56 apart. A second spring 72, which acts exclusively on the actuator piston 56 to bias same toward a home position, is disposed in the cavity 69 about the housing 68.

With this arrangement, when the brakes are applied via the depression of the brake pedal 74 (see FIG. 2) the tandem master cylinder 76 pressurizes the first and second fluid circuits A and B with pressures PA and PB respectively. As shown in FIG. 2, the first circuit A communicates with a front right-hand wheel brake cylinder 78R and a rear left-hand wheel brake cylinder 80L while the second circuit B communicates with a front left-hand wheel brake cylinder 78L and a rear right-hand wheel brake cylinder 80R.

Prior to the application of the brakes producing a vehicular deceleration which will induce the "G" ball 62 to roll up and contact the valve seat 64 and thus isolate the variable volume chamber 59 from the master cylinder 76, the first and second plungers and the free piston remain in the illustrated position wherein both of the poppet valves 34, 44 are open which allows essentially the same pressure to be fed to the front and rear wheel cylinders. However, upon the "G" ball seating on the valve seat 64 and preventing any further pressure increase in the variable volume chamber 59, the biasing force urging the first plunger 28 to the right and into the illustrated position, becomes constant whereafter the pressures fed to the rear brake cylinders undergo modulation and be reduced with respect to those fed to the front brake cylinders. That is to say, as the pressure discharged from the second outlet port 48 rises, the second plunger 42 will be moved leftwardly to bring the stem of the poppet valve 44 out of contact with the end of the free piston 36. The poppet valve 44 thus closes momentarily preventing any increase in the pressure discharged through the second outlet port 48. Simultaneously, the pressure PB is passed via poppet valve 34 to the outlet port 40. At this time, due to the closure of the poppet valve 44 the pressure on the right-hand end of the free piston 36 is greater than the pressure on the other end thereof. The free piston 36 thus moves leftwardly allowing the first poppet valve 34 to close while opening the second poppet valve 44. The pressure discharged from the first outlet port 40 is momentarily held constant while that discharged from port 48 rises due to the opening of the poppet valve 44. Hence, the pressure exerted on the left-hand end of the free piston 36 momentarily becomes higher than that exerted on the right-hand end, hence moving same rightwardly to allow poppet valve 44 to close and causing poppet valve 34 to open. Subsequent reciprocation of the free piston 36 back and forth thus modulates the pressure fed to the rear wheel brake cylinders, that is to say, prcduces modulated pressures PA' and PB'.

Under these normal operating conditions, (that is when no malfunction occurs in either circuit) the first plunger unit 28 is held firmly in the illustrated position via the force produced by pressure PA acting on the large diameter end of the unit which overcomes the essentially equal pressure PB acting on the small diameter end of same. This compensates for any momentary fluctuation between the pressures PA and PB that might occur and ensures that the first plunger unit 28 will not unwantedly move leftwardly under normal operating conditions.

Now, should through some malfunction of circuit A the pressure PA be lost, the pressure PB acting on the small diameter end of the first plunger unit and free piston 36 will move same to the left as seen in the drawings. To define a maximum possible travel L2 of the plunger unit 28 within the stepped bore 26, a stop or limit member 82 is disposed therein and adapted to be abutted by the first plunger unit 28 while allowing the second plunger 42 to pass therethrough unhindered. However, the travel of the second plunger 42 is limited by the construction of cup-like cylindrical housing 68 which is adapted to abut the face of the actuator piston 56 after moving through a distance of L1 (which is shorter than distance L2). This arrangement ensures that under these circumstances, the free piston 36 will be held in a position wherein the poppet valve 34 will be prevented from closing and thus preventing any unwanted modulation of the pressure fed to the rear right-hand wheel brake cylinder 80R. This of course provides a fail-safe operation by maximizing the now limited braking capacity.

Conversely, should through a malfunction of the circuit B, the pressure PB be lost, the first plunger unit and the free piston 36 will be driven to the illustrated position. Upon braking, the pressure PA will rise to a relatively high value (for example double the normal value) before a vehicular deceleration will be produced which will in turn induce the "G" ball 62 to seat on the seat 64 and initiate pressure modulation to produce pressure PA'. Further, due to the absence of the the pressure PB acting on the right-hand end of the free piston 36, a very high pressure will have to prevail in the second outlet port 48 before the second plunger will move sufficiently to the left to allow the poppet valve 44 to close. That is to say, under normal operating conditions the second plunger is biased to the left by the pressure PB acting on the right-hand end of the free piston. However, in the absence of this bias, the point at which modulation of the pressure fed to the rear left-hand wheel brake cylinder 80L will occur (during a malfunction of circuit B) is abnormally raised to the degree that an adequately high pressure will be transmitted to said cylinder and thus provide a fail-safe operation comparable with the former one.

Although the preferred embodiment has been described in conjunction with a valve arrangement wherein a "G" ball-type valve is used, it is within the scope of the present invention to use, in place of such a valve, a linkage system wherein the bias which determines the modulation point of the modulation valving is determined via a mechanical connection with the vehicle suspension or the like.

A further aspect of the present invention is deemed to come in its inherent ease of production and assembly. That is to say, as the valve is formed simply of first and second housings wherein the first housing 20 need only be formed basically with (a) a through bore, part of which defines the cavity 69 which houses the cup-like cylindrical housing 68 and springs 70, 72, and which is closed by a member in which actuating piston 56 is slidably received and (b) passages which terminate in the valve seat 64. The second housing 22 on the other hand is formed basically with only a cavity 69 for the "G" ball 62 and the stepped bore 26 for receiving the first plunger unit 28, free piston 36 and second plunger 42 (all of which are slidably received one in the other) rendering the subsequent installation of the limit 82, bearing 83 and seal 84 therein extremely easy. Boring of the second housing 22 to form the necessary ports and establish the necessary communication with the "G" ball cavity prior to assembly is also very easy. Moreover, as long as the distance L2 through which the first plunger unit 28 can move in the stepped bore is greater than the distance L1 through which the cup-like cylindrical housing 68 can move before abutting against the face of the actuating piston 56, the fail-safe operation of the first poppet valve 34 is assured.

What is claimed is:

1. In a dual circuit hydraulic braking system for a wheeled vehicle, a pressure control valve comprising:
    a housing having a first stepped bore therein;
    a first plunger reciprocatively received in said first stepped bore, said first plunger having a second bore formed therein;
    a second plunger reciprocatively disposed in said second bore to define a variable volume chamber in said first plunger;
    a free piston reciprocatively disposed totally within said variable volume chamber;
    a first valve disposed in said first plunger and positioned to directly abut said free piston;
    a second valve disposed in said second plunger and positioned to directly abut said free piston; and
    means responsive to the deceleration of said vehicle for applying a bias to said second plunger.

2. A pressure control valve as claimed in claim 1, wherein said first plunger takes the form of a stepped piston sealingly disposed in said first stepped bore and which has a large diameter portion and a small diameter portion, said small diameter portion being exposed to a first pressure and said large diameter portion being exposed to a second pressure, so that the first plunger is normally biased to a first predetermined position.

3. A pressure control valve as claimed in claim 2, wherein said first and second pressures are fed to the valve from a tandem master cylinder.

4. A pressure control valve as claimed in claim 1, wherein said first and second valves are poppet valves having stems which stems are each abuttable with an axial end of said free piston.

5. A pressure control valve as claimed in claim 1, further comprising means for limiting the maximum travel of said second plunger in said stepped bore in one axial direction thereof by a predetermined distance, said first plunger, said second plunger and said free piston being arranged such that upon the movement of said second plunger in said one axial direction being terminated by said maximum travel limiting means, said second plunger abuts against said free piston which subsequently abuts against said first plunger and holds said first valve open.

6. A pressure control valve as claimed in claim 1, further comprising:
    a second housing detachably connected to the first said housing; and wherein
    said deceleration responsive means includes
    a mass movably disposed in a chamber formed in one of said first and second housings; and
    a device disposed in said second housing responsive to the position of said mass for applying a bias to said second stepped piston.

7. A pressure control valve as claimed in claim 1, further comprising:
    means defining a first fluid circuit which is controlled by said first valve, said first fluid circuit interconnecting a tandem master cylinder with a front right hand wheel and a rear left hand wheel of said vehicle; and
    means defining a second fluid circuit which is controlled by said second valve, said second fluid circuit interconnecting said tandem master cylinder and the front left hand wheel and the rear right hand wheel of said vehicle.

8. A pressure control valve as claimed in claim 7, further comprising:
    means for, in the case of the failure of said first circuit, permitting the pressure transmitted through said second fluid circuit to said front left hand wheel and said rear right hand wheel to substantially maximize before said second valve is permitted to close; and means for, in the case said second fluid circuit fails, causing said first valve to remain continuously open.

9. In a dual circuit hydraulic braking system for a wheeled vehicle, a pressure control valve comprising:
a first housing having a first stepped bore therein;
a first plunger reciprocatively received in said first stepped bore, said first plunger having a second bore formed therein;
a free piston reciprocatively disposed totally within said second bore;
a second plunger reciprocatively disposed in said second bore to define a variable volume chamber in which said free piston is enclosed;
a first valve disposed in said first plunger, said first valve being positioned to abut said free piston and adapted to be opened by said free piston;
a second valve disposed in said second plunger, said second valve being positioned to abut said free piston and adapted to be opened by said free piston;
a second housing which is detachably connected to said first housing in a manner to define an interface therebetween; and
means disposed in one of said first and second housings which is responsive to the deceleration of said vehicle for applying a bias to said second plunger.

10. In a pressure control valve for a dual circuit automotive vehicle braking system:
means defining a first stepped bore having a large diameter portion and a small diameter portion;
a first stepped piston slidably received in first stepped bore which has a large diameter portion and a small diameter portion;
means defining a second stepped bore in said first stepped piston, said second stepped bore having a small diameter portion and a large diameter portion;
a second stepped piston having a large diameter portion and a small diameter portion, said second stepped piston being slidably disposed in said second stepped bore with the large diameter portion thereof received in said large diameter portion of said second stepped bore so as to define a variable volume chamber within said second stepped piston; and
a free piston received totally within said first stepped piston and mounted to move reciprocatively in said small diameter portion of said second stepped bore, said free piston being arranged to directly abut first and second valves disposed in said first and second stepped pistons respectively.

11. A pressure control valve as claimed in claim 10, further comprising:
a first housing in which said first stepped bore is defined; and
a second housing detachably connected to said first housing.

12. A pressure control valve as claimed in claim 11, further comprising:
a mass movably disposed in a chamber formed in one of said first and second housings; and
means disposed in said second housing responsive to the position of said mass for applying a bias to said second stepped piston.

13. A pressure control valve as claimed in claim 10, further comprising:
means defining a first fluid circuit which is controlled by said first valve, said first fluid circuit interconnecting a tandem master cylinder with a front right hand wheel and a rear left hand wheel of said vehicle; and
means defining a second fluid circuit which is controlled by said second valve, said second fluid circuit interconnecting said tandem master cylinder and the front left hand wheel and the rear right hand wheel of said vehicle.

14. A pressure control valve as claimed in claim 13, further comprising:
means for, in the case of the failure of said first circuit, permitting the pressure transmitted through said second fluid circuit to said front left hand wheel and said rear right hand wheel to substantially maximize before said second valve is permitted to close; and
means for, in the case said second fluid circuit fails, causing said first valve to remain continuously open.

* * * * *